Sept. 30, 1958  G. F. JOHNSON  2,854,125
CONTAINER TRANSFERRING MEANS
Filed Feb. 28, 1955  15 Sheets-Sheet 1

INVENTOR.
George F. Johnson
BY
Brown, Jackson, Boettcher & Dienner
Attys.

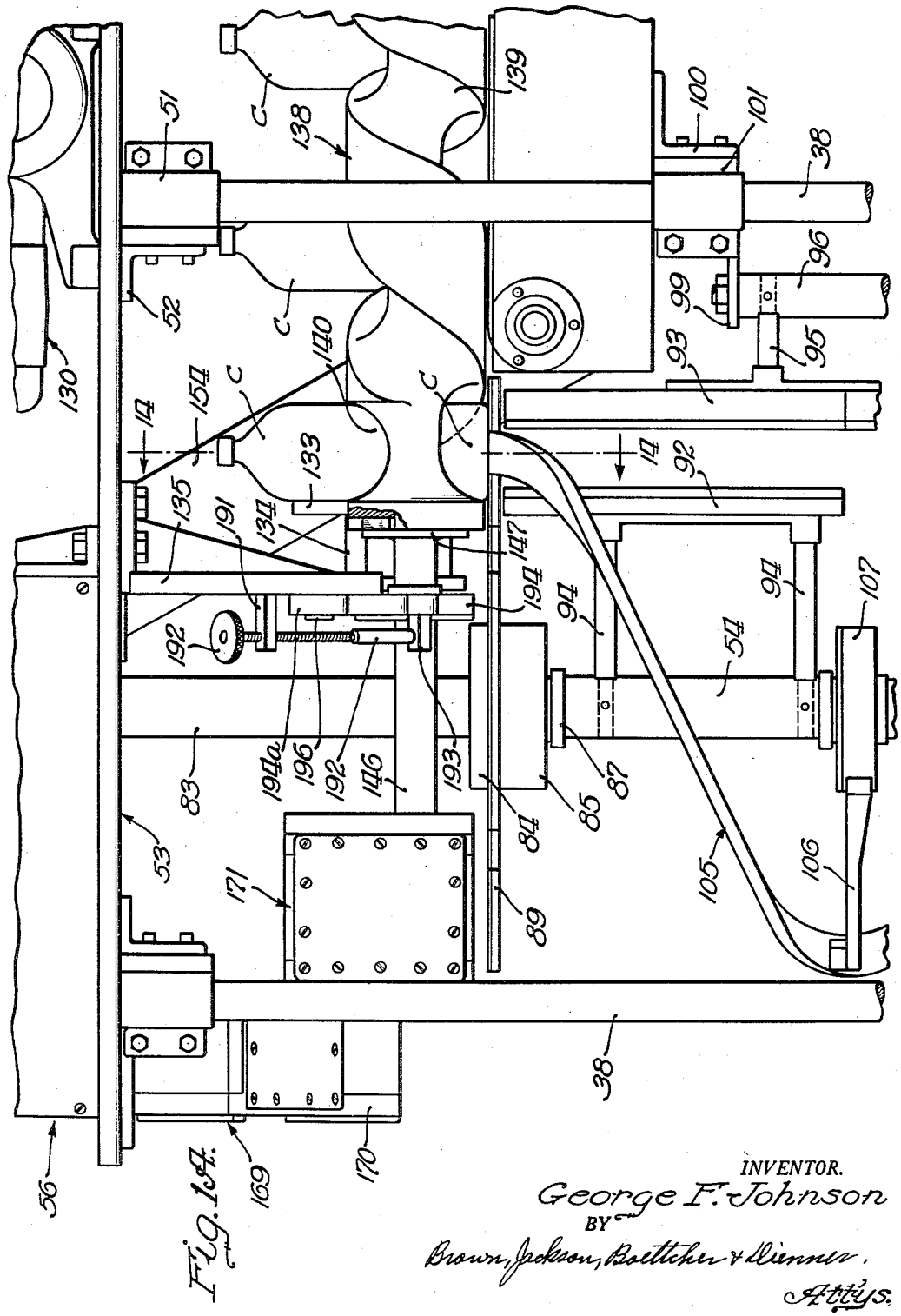

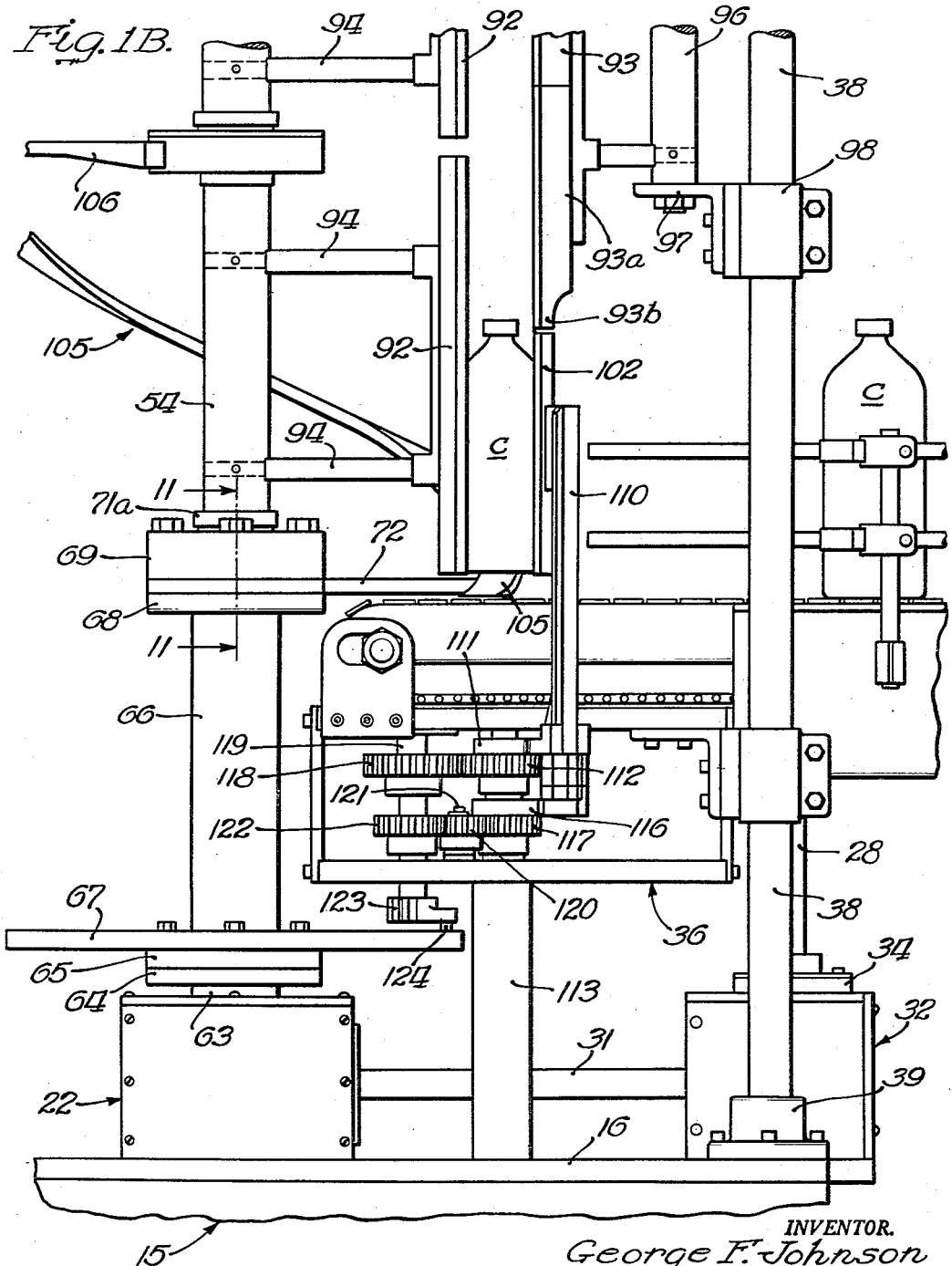

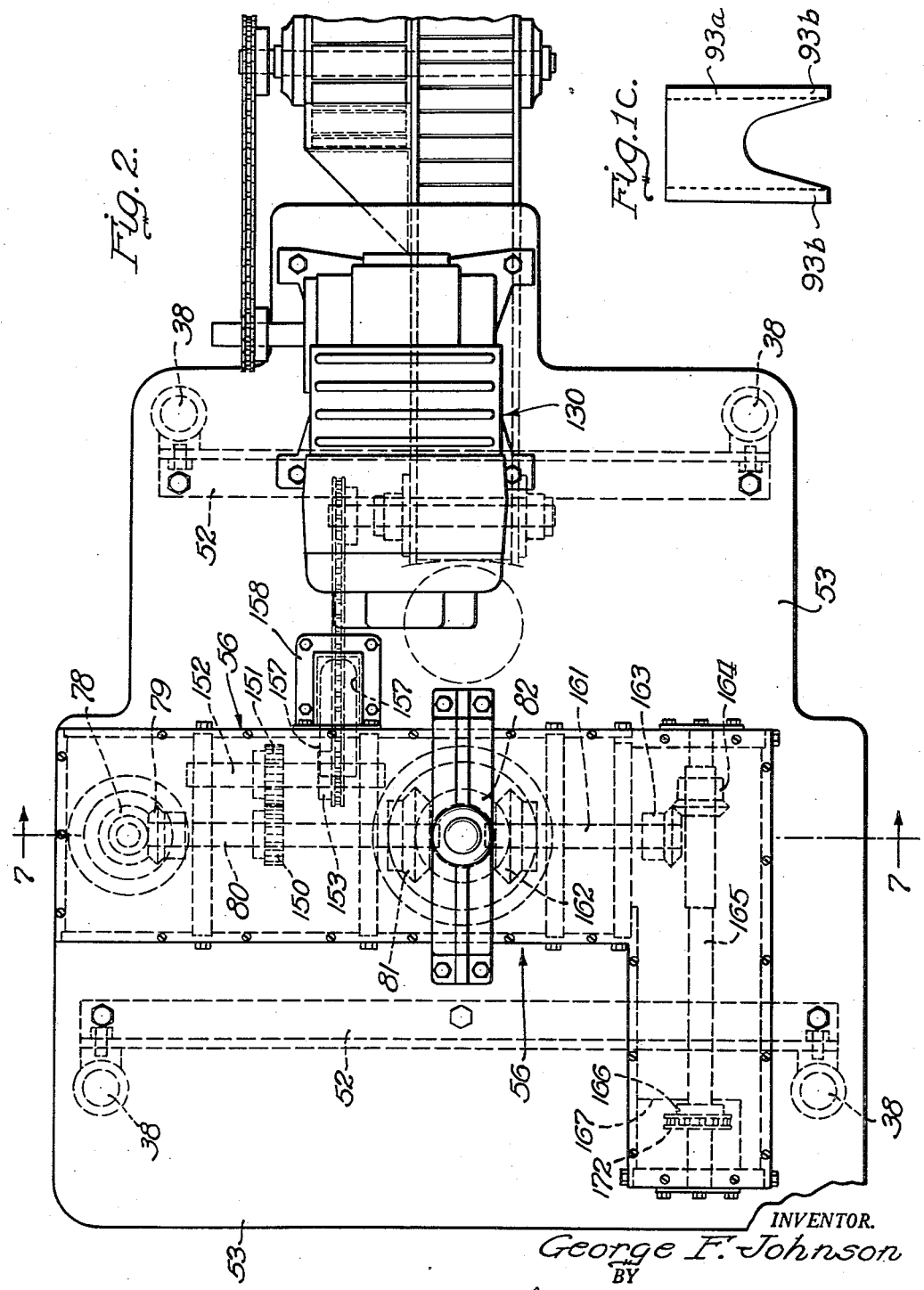

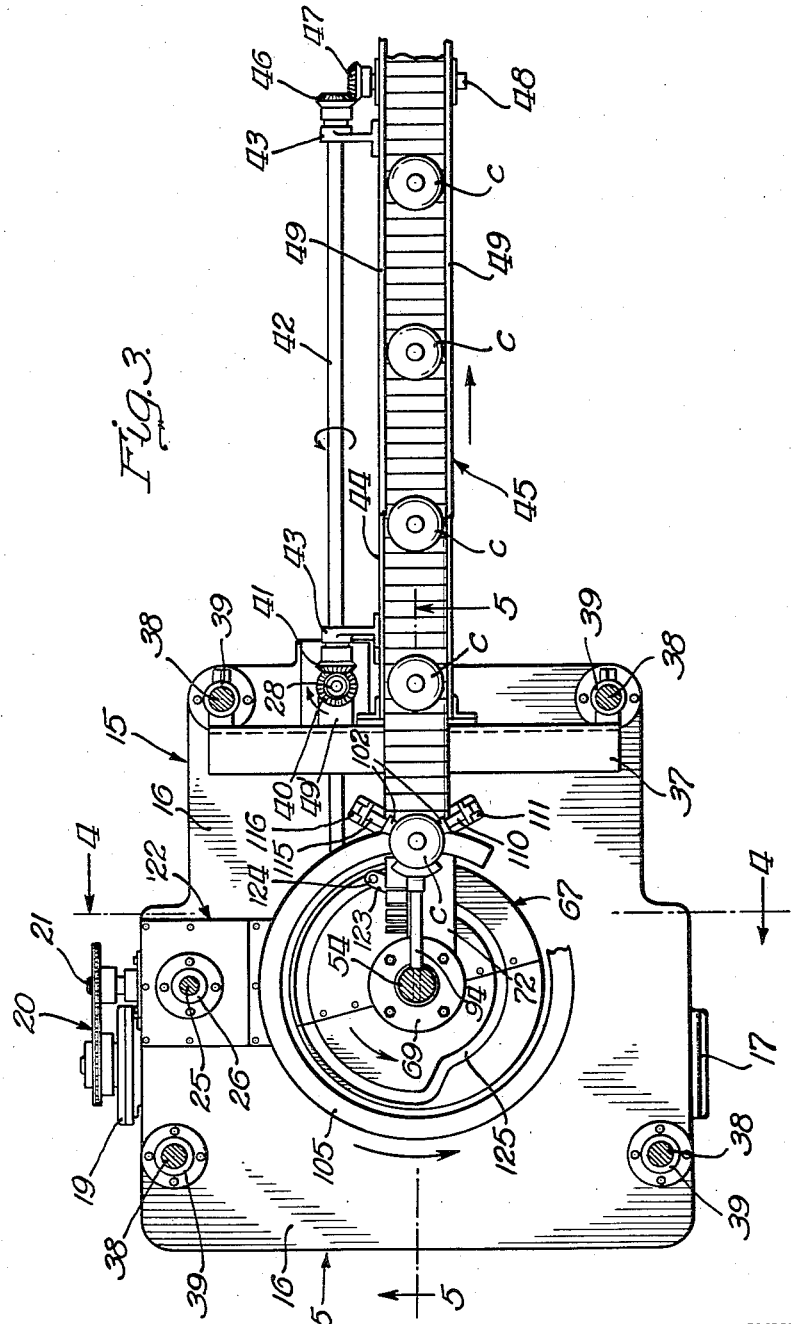

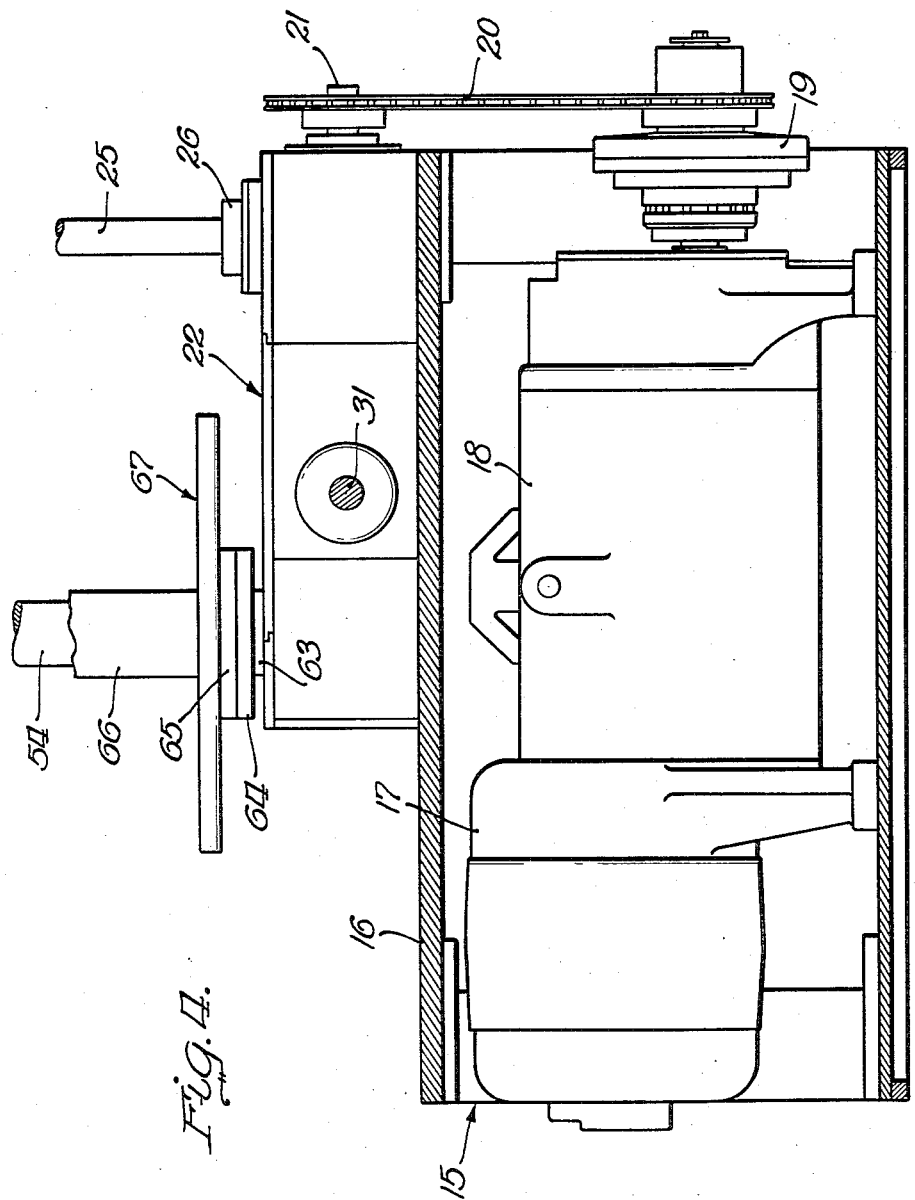

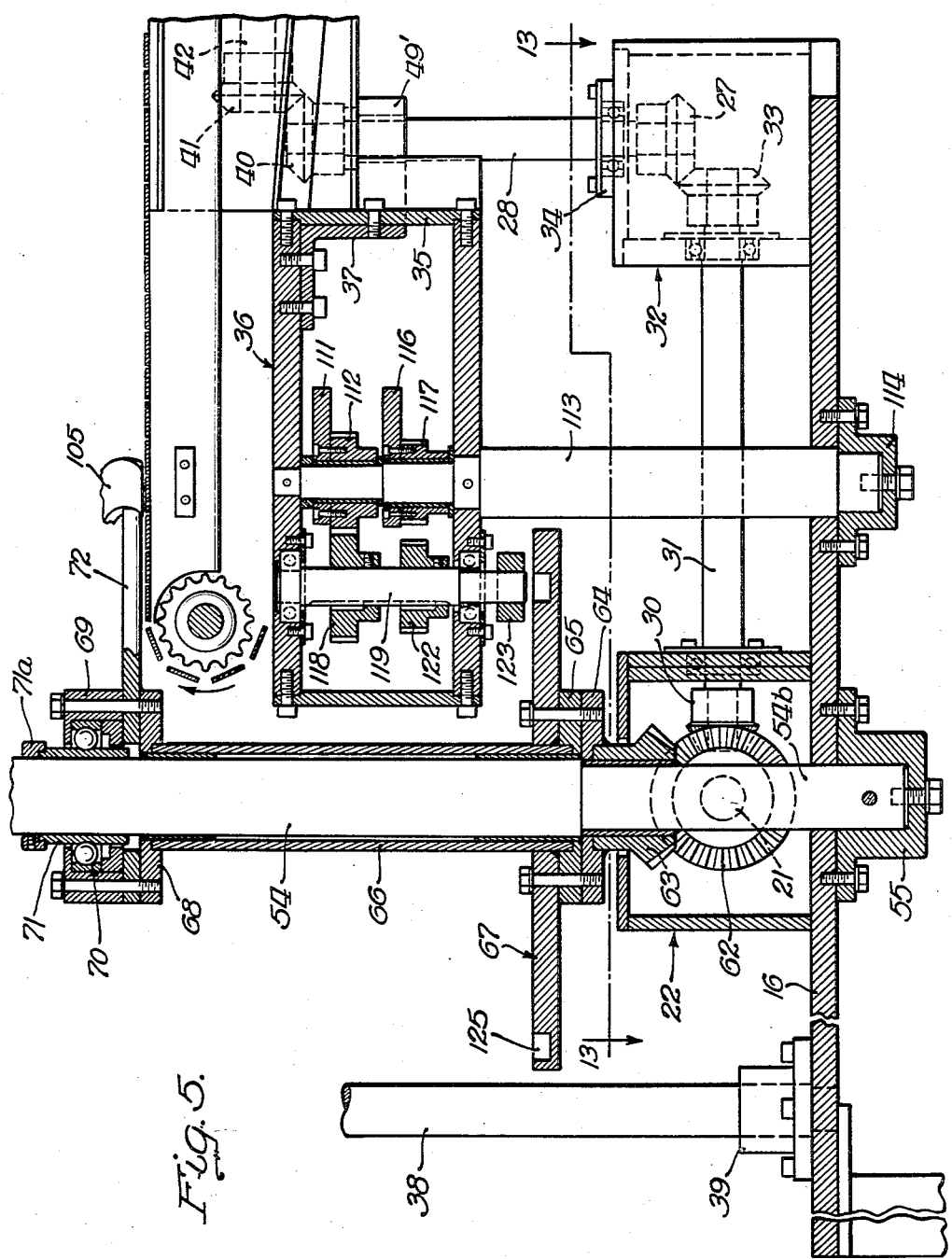

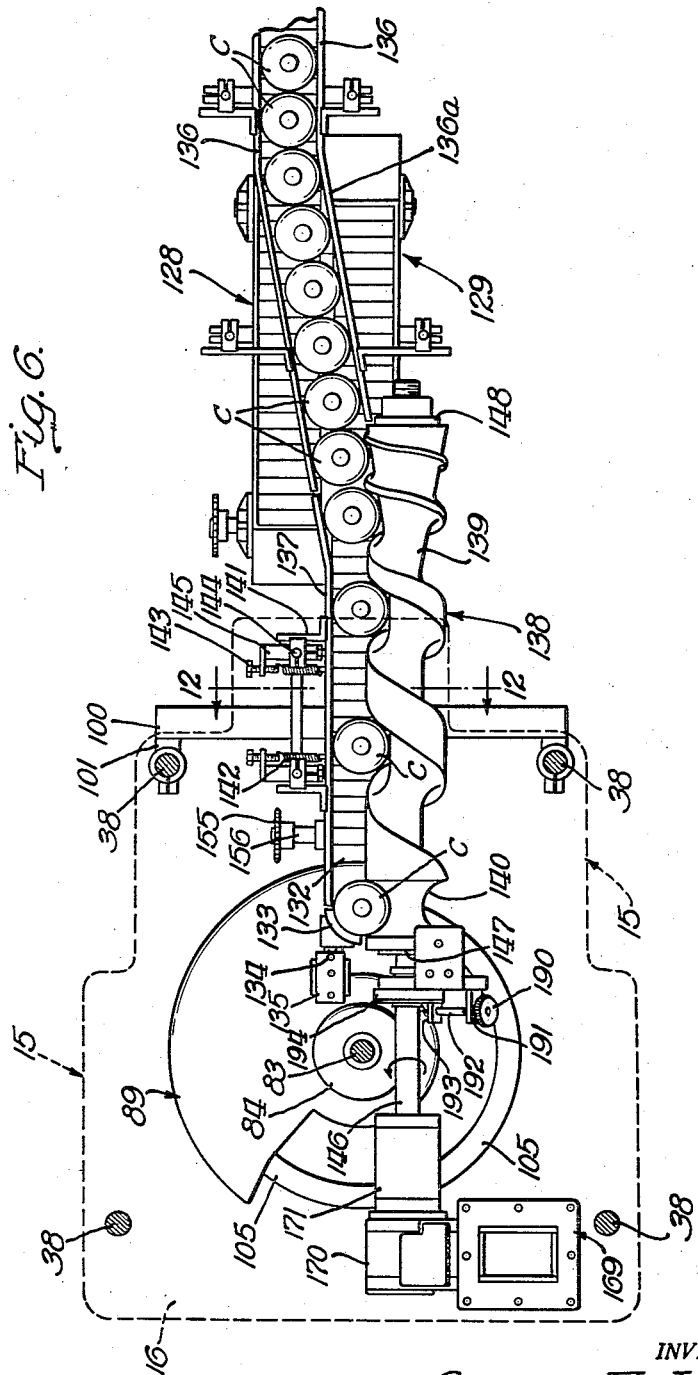

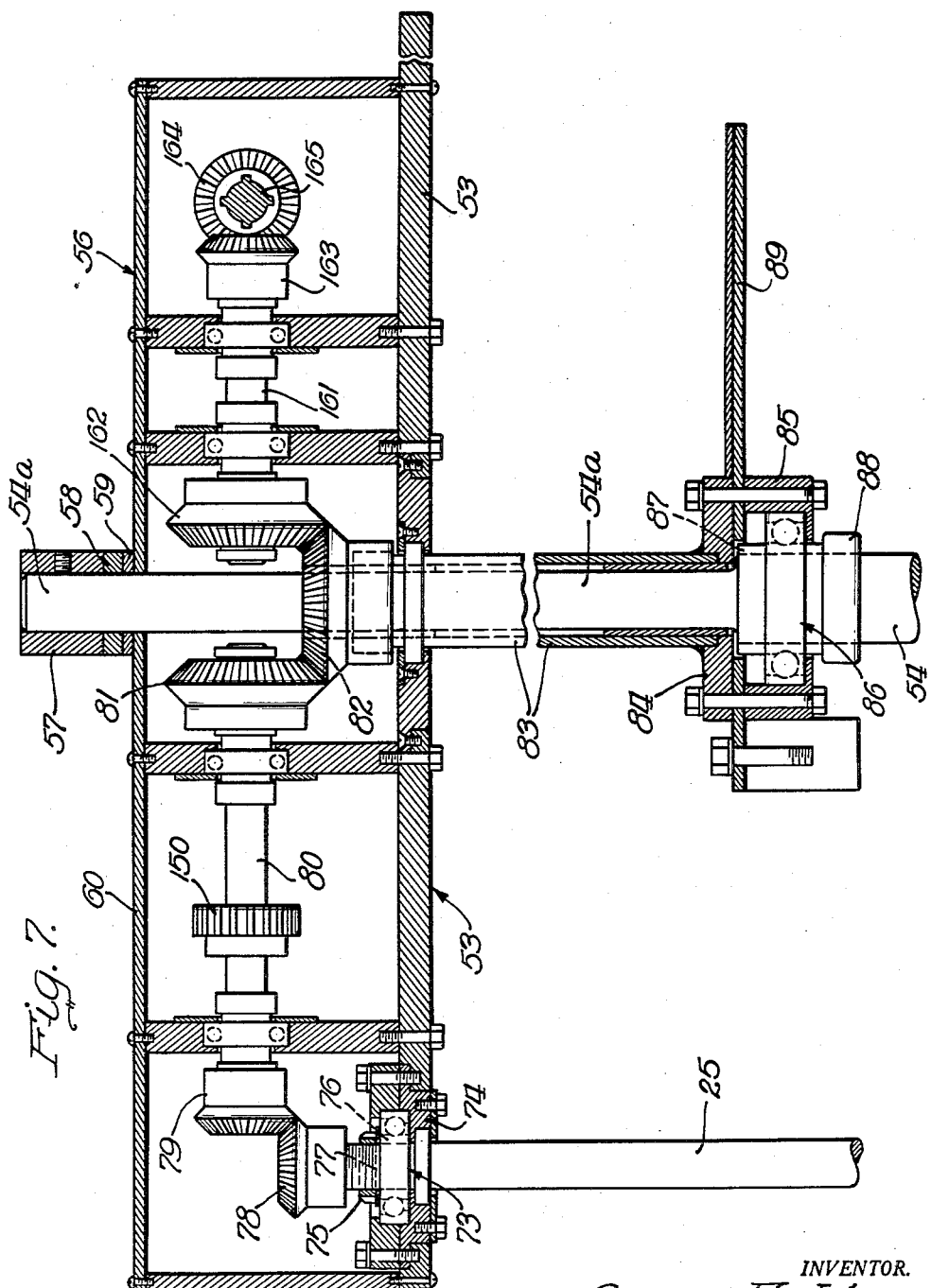

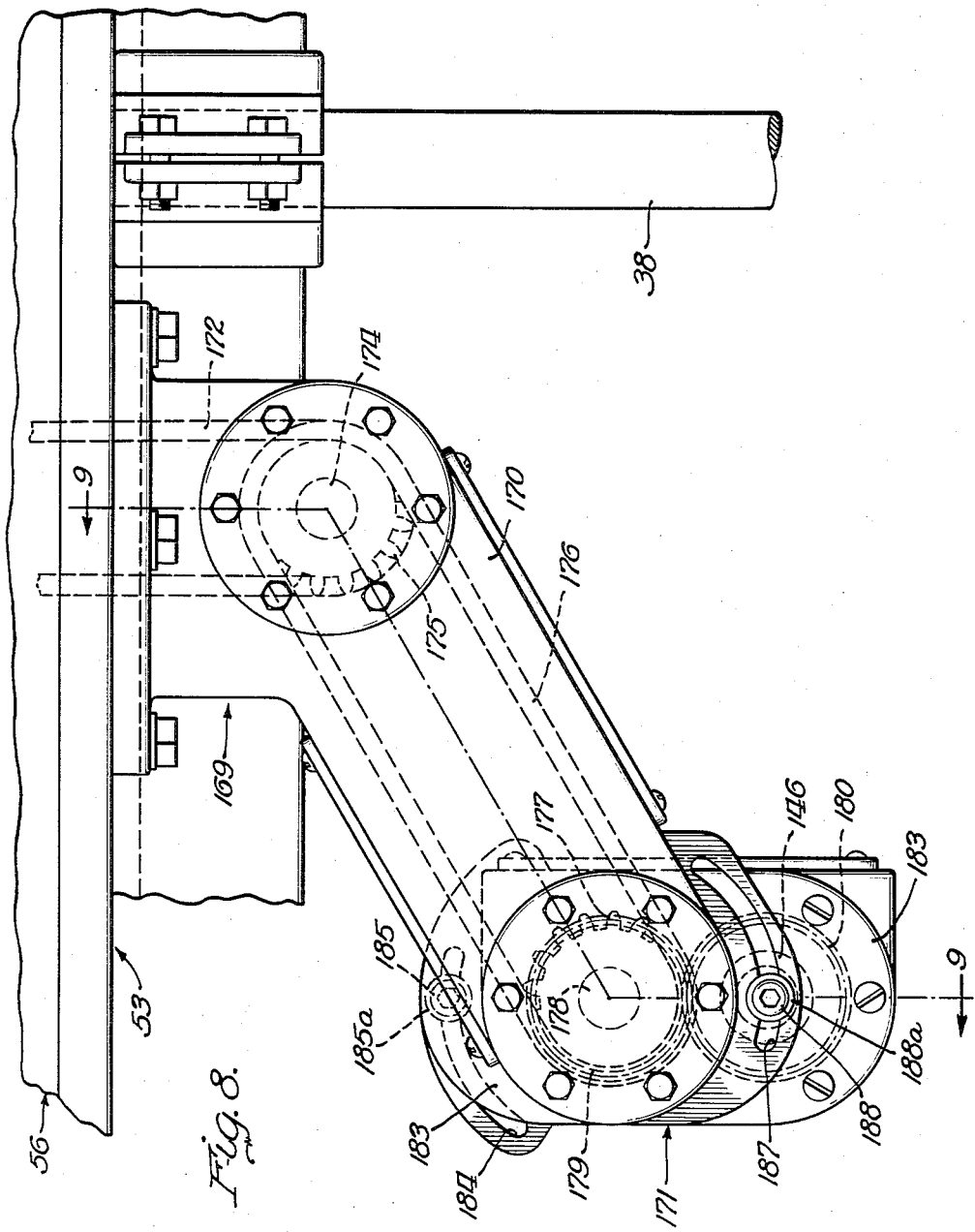

Sept. 30, 1958 G. F. JOHNSON 2,854,125
CONTAINER TRANSFERRING MEANS
Filed Feb. 28, 1955 15 Sheets-Sheet 11

INVENTOR.
George F. Johnson
BY
Brown, Jackson, Boettcher & Dienner,
Attys.

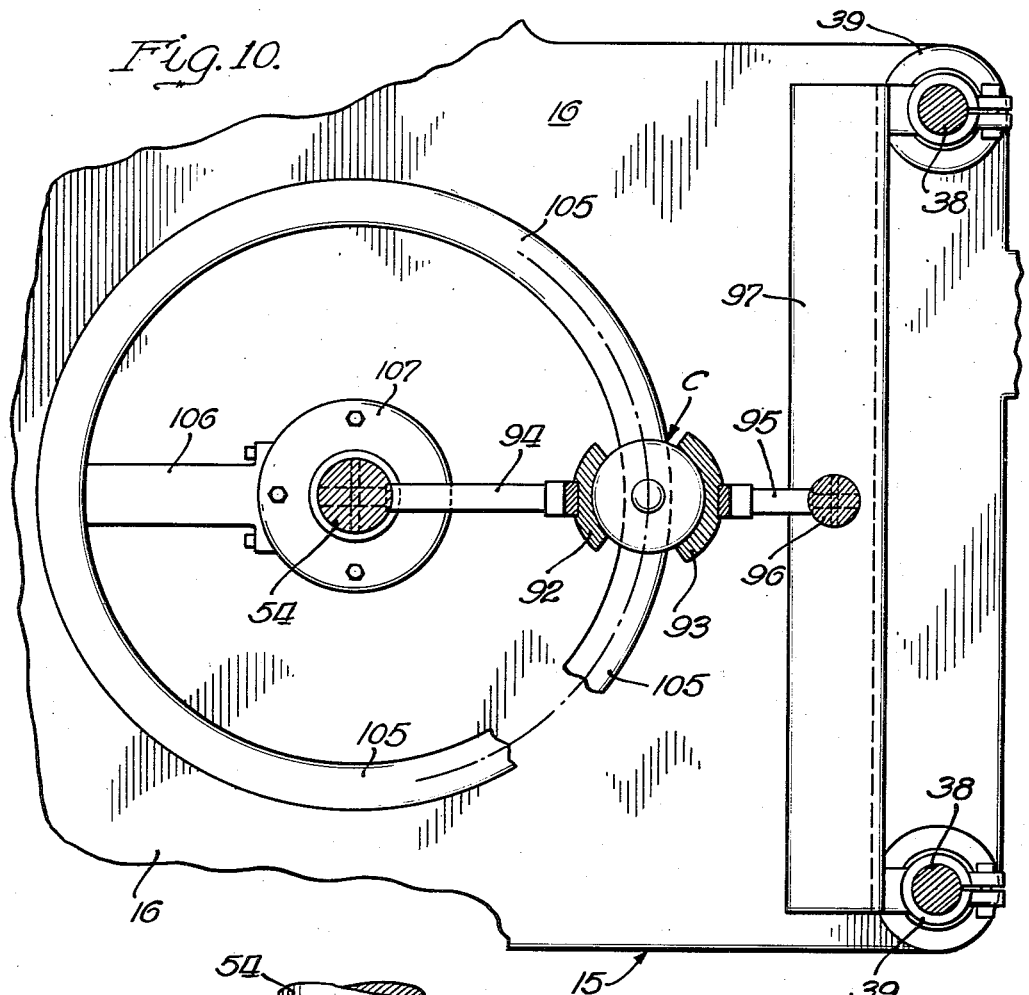
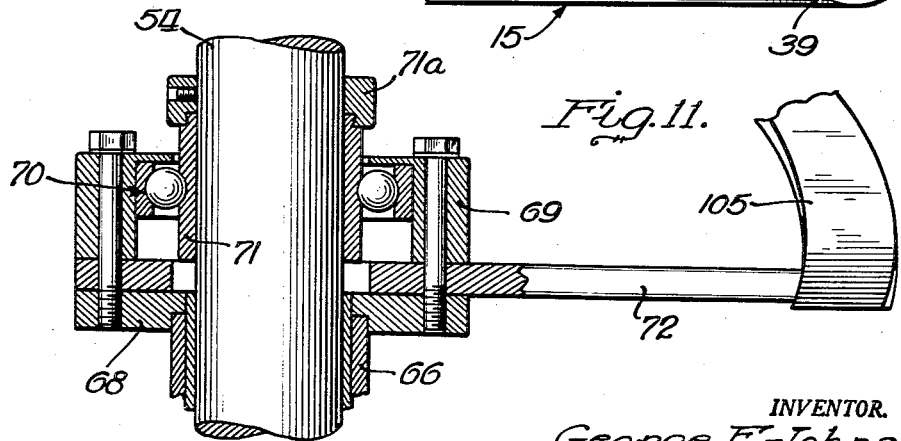

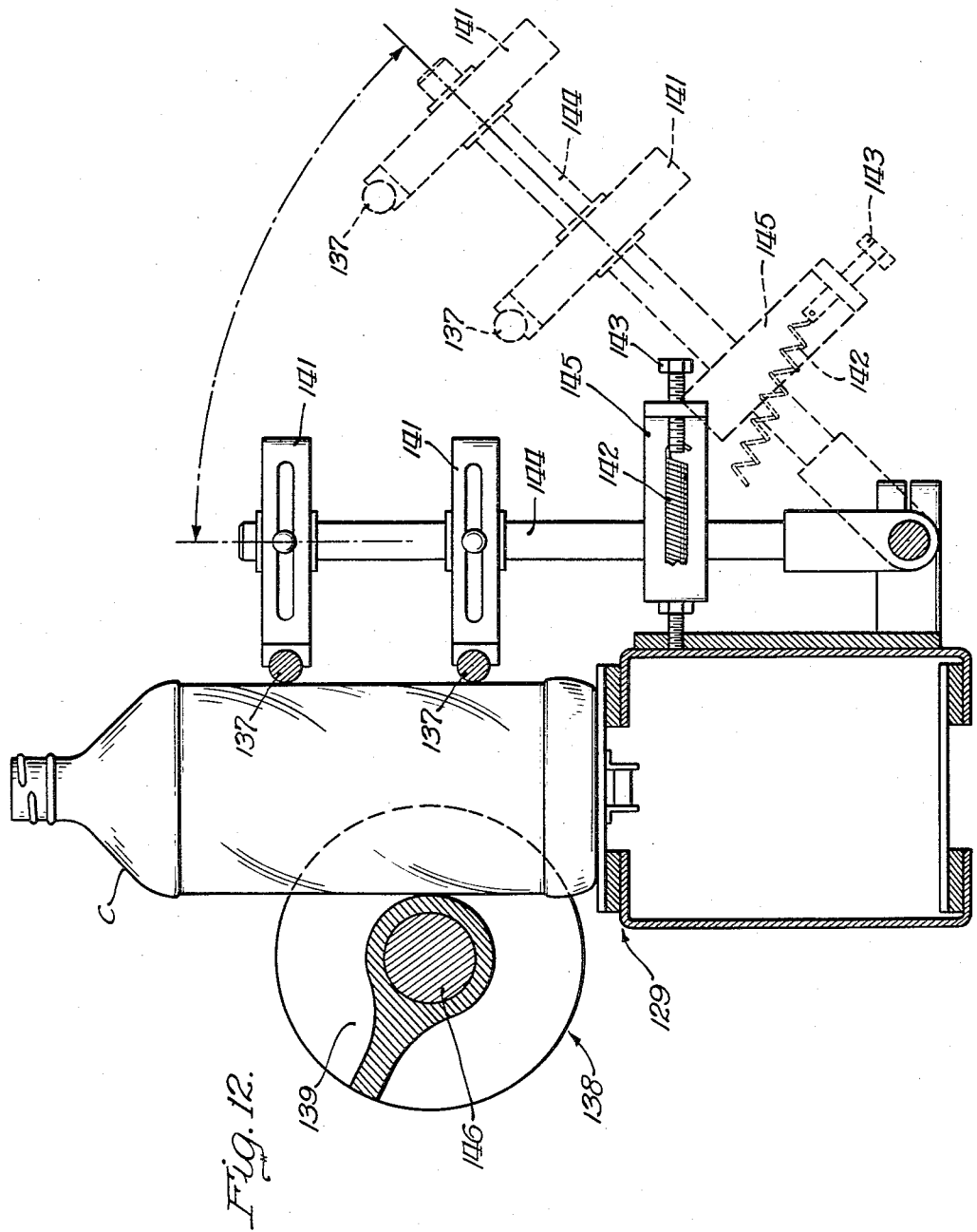

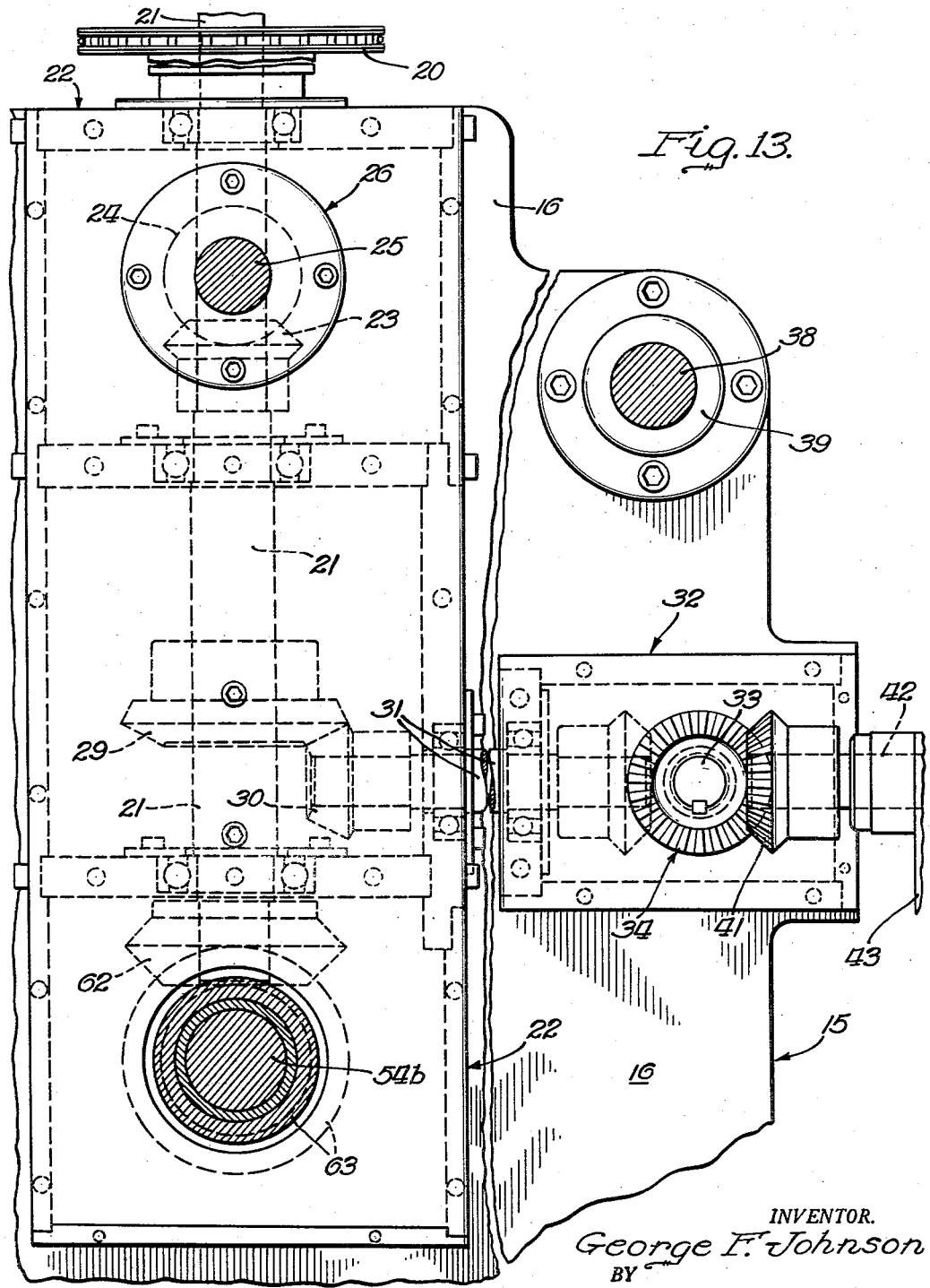

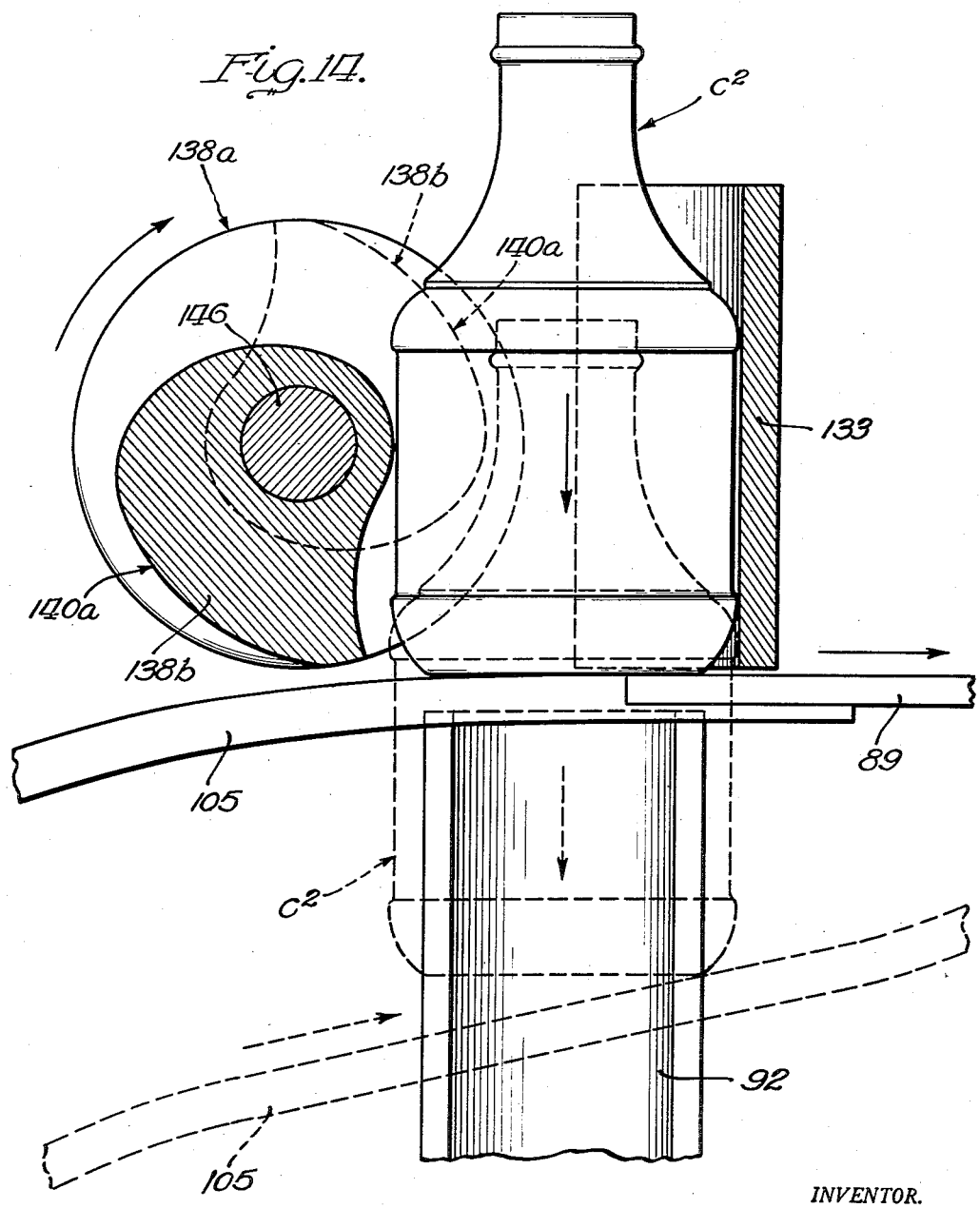

United States Patent Office 2,854,125
Patented Sept. 30, 1958

2,854,125

CONTAINER TRANSFERRING MEANS

George F. Johnson, Chicago, Ill., assignor to Corn Products Refining Company, New York, N. Y., a corporation of New Jersey Application February 28, 1955, Serial No. 490,779

6 Claims. (Cl. 198—104)

This invention relates to transferring machines and has to do with a machine for transferring containers and other articles from one level to another.

Machines for transferring articles from one level to another by means of a rotating helical track and associated guide means are known. Such known machines as I am familiar with are intended for handling containers of one size only and are not readily adapted for transferring containers of various sizes.

My invention is directed to a transferring machine which may readily be adapted for handling articles or containers of various sizes. To that end I provide guides for the articles to be transferred and means whereby the guide members may readily be removed and replaced for handling articles of various sizes. Travel of the articles is controlled by a rotating helical track the convolutions of which pass through the guide way defined by the guide members. The guide members comprise inner and outer members, the inner guide members being formed in sections spaced apart and carried by arms extending from a fixed column disposed to one side of the guide way, and the helical track is carried by arms rotatably mounted on the column and passing between the inner guide members. The column thus provides a common support for the inner guide member and for the track, the latter being effectively supported by its associated arms so as to possess desired rigidity and guard against objectionable spring or deflection of the track such as might interfere with accurate operation of the machine. The articles are delivered to the receiving end of the guide way by means comprising a timing worm mounted on a drive shaft which is unobstructed at its outer end for ready removal and replacement of the worm to suit varying requirements. The outer guide members comprise members at the delivery end of the guide way normally in operative position and movable to an inoperative position, in which they clear the articles deposited by the track onto a take-off or discharge conveyor. Further objects and advantages of my invention will appear from the detail description.

In the drawings:

Figure 1A is a side view, on an enlarged scale, of the upper portion of the machine of Figure 1, with certain parts broken away;

Figure 1B is a side view, on an enlarged scale, of the lower portion of the machine of Figure 1, with certain parts broken away;

Figure 1C is an outer face view of the lower portion of the lowermost outer guide member of the vertical article guide way.

Figure 2 is a plan view of the machine of Figure 1, with certain parts broken away;

Figure 3 is a sectional view taken susbtantially on line 3—3 of Figure 1, with the outer portion of the discharge conveyor broken away;

Figure 4 is a sectional view of the base housing taken substantially on line 4—4 of Figure 3, certain parts being shown in elevation, on an enlarged scale;

Figure 5 is a sectional view, on an enlarged scale, taken substantially on line 5—5 of Figure 3, certain parts being shown in elevation;

Figure 6 is a sectional view taken substantially on line 6—6 of Figure 1 on an enlarged scale;

Figure 7 is a sectional view taken substantially on line 7—7 of Figure 2;

Figure 8 is an outer end view, on an enlarged scale, of the worm drive gear housing taken substantially on line 8—8 of Figure 1;

Figure 10 is a sectional view, on an enlarged scale, taken substantially on line 10—10 of Figure 1, with certain parts broken away and certain other parts omitted for clearness of illustration;

Figure 11 is a sectional view, on an enlarged scale, taken substantially on line 11—11 of Figure 1B and with the helical track turned approximately 90° from its position shown in Figure 1B, certain parts being shown in elevation and certain other parts being broken away.

Figure 12, is a sectional view, on an enlarged scale, taken substantially on line 12—12 of Figure 6;

Figure 13 is a sectional view, on an enlarged scale, taken substantially on line 13—13 of Figure 5, with certain parts broken away; and Figure 14, is a sectional view, on an enlarged scale, taken substantially on line 14—14 of Figure 1A.

Figure 1:
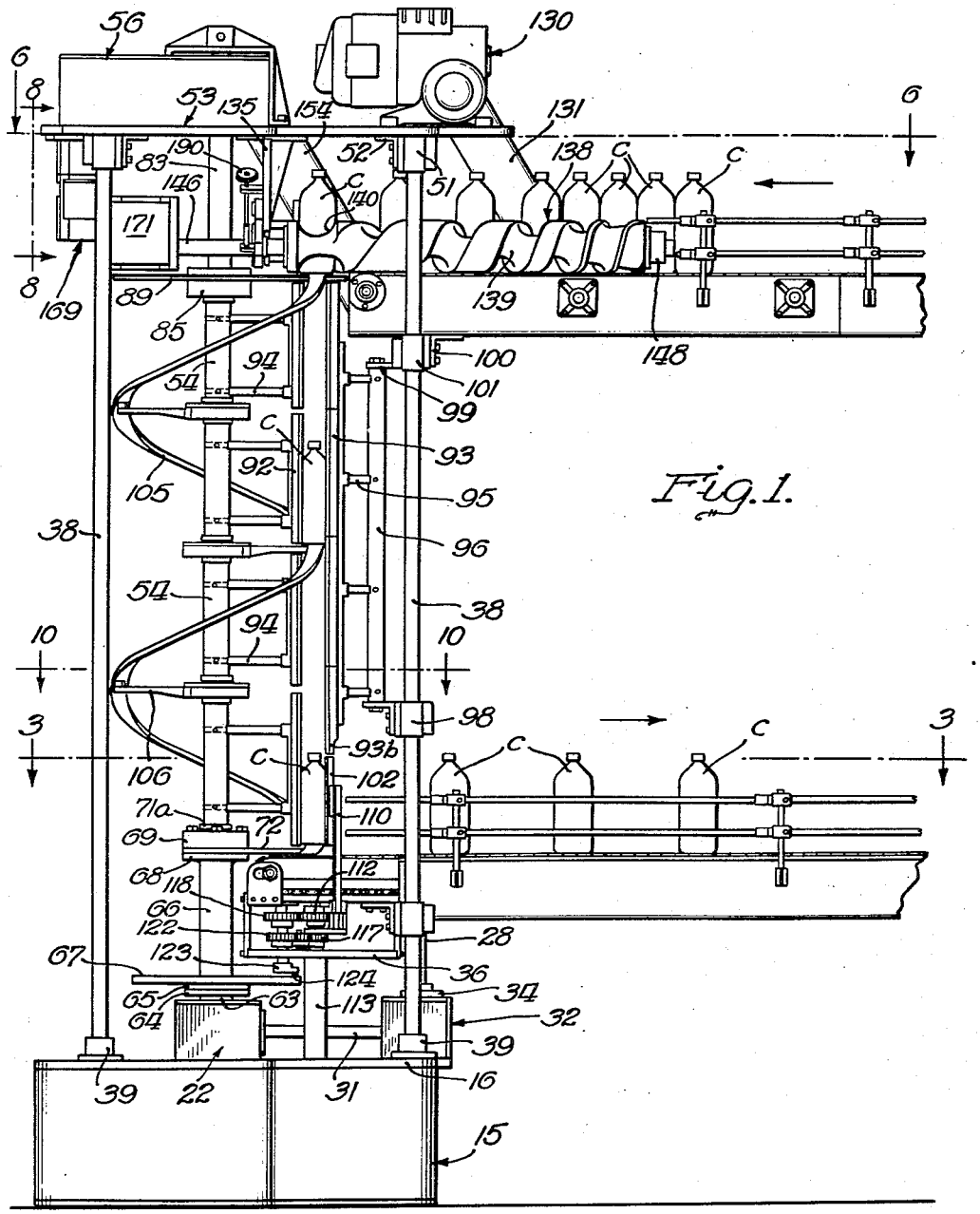
Figure 1 is a side view of a transferring machine embodying my invention, certain parts being broken away.
Figure 9:
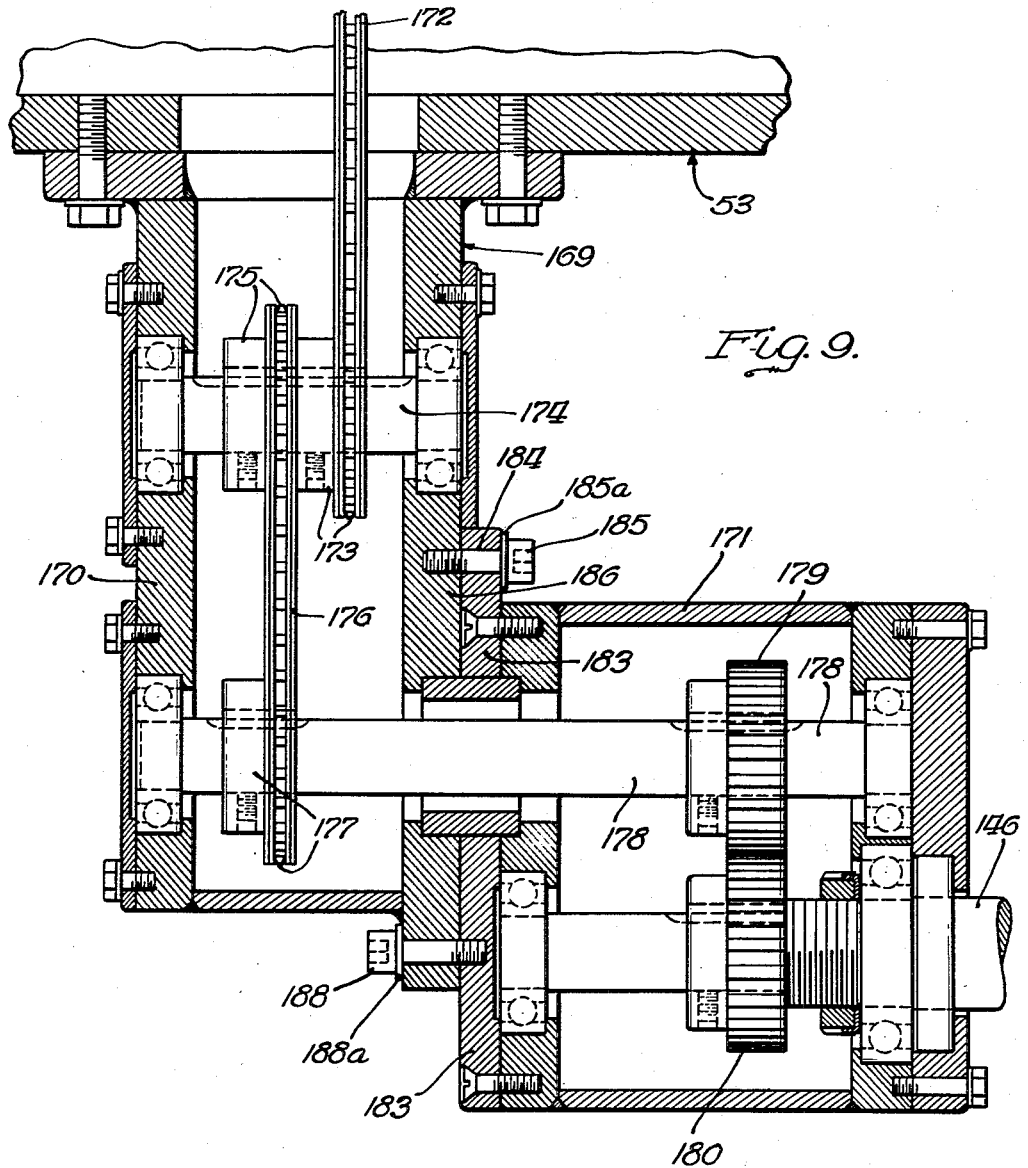
Figure 9 is a sectional view, on an enlarged scale, taken substantially on line 9—9 of Figure 8.

The machine of my invention has a base housing 15 of generally rectangular shape in plan closed by a cover plate 16 suitably secured thereon. An electric motor 17, of suitable known type, is mounted in housing 15. Motor 17 has driving connection (Figures 3 and 4), through a speed reducing unit 18 and a constant torque slip clutch 19, also mounted in housing 15 and of suitable known type, and chain and sprocket means 20, to a shaft 21 rotatably mounted in a gear housing 22 mounted on cover plate 16. A miter gear 23 is secured on shaft 21 adjacent the outer end of gear housing 22 and meshes with a miter gear 24 secured on the lower end of a vertical transmission shaft 25. The lower end portion of shaft 25 is reduced and is mounted in a thrust ball bearing (not shown) in a bearing housing 26 secured on the top of gear housing 22 and is thereby effectively restrained against downward movement. The shaft 25 is driven from shaft 21 through miter gears 23 and 24, as will be understood from what has been said, for a purpose to be described later.

A second miter gear 29 is secured on shaft 21 and meshes with a miter pinion 30 secured on the inner end of a horizontal shaft 31 extending through, and rotatably mounted in, one side wall of gear casing 22. Shaft 31 extends at its other end portion into a gear casing 32 mounted on cover plate 16 adjacent one end of housing 15 and is rotatably mounted in one side wall of casing 32; as shown more clearly in Figures 3 and 5. A miter pinion 33, secured on the outer end of shaft 31, meshes with a miter pinion 27 secured on the lower end of a vertical shaft 28 extending through the top of gear casing 32. The lower portion of shaft 28 is reduced and mounted in a thrust bearing within a bearing housing 34 secured to the top of casing 32, the thrust bearing rotatably supporting shaft 28 and effectively restraining it against downward movement in a known manner. Shaft 28 is rotatably mounted, a short distance below its upper end, in a bearing bracket 49' secured to the outer end wall 35 of an open frame 36 bolted to an angle cross member 37 secured to two corner posts 38 secured at their lower ends in bolting flanges 39 bolted to cover plate 16 and housing 15. There are four corner posts 38 the purpose of which will be explained later. A miter pinion 40, secured on the upper end of shaft 28, meshes with a miter pinion 41 secured on the inner end of a horizontal shaft 42, shown more clearly in Figure 3, rotatably mounted in bearing brackets 43 secured to one side of frame 44 of an endless discharge conveyor 45 extending outward from frame 36 and, at its inner portion, overlying the latter. A miter pinion 46, secured on the outer end of shaft 42, meshes with a miter pinion 47 secured on one end of drive shaft 48 of conveyor 45. The upper run of conveyor 45 travels outward, as indicated by the arrow in Figure 3, for moving outward articles, such as bottles or containers c delivered thereto by means to be described presently. The conveyor 45 is of conventional type and is provided at the sides thereof with guide rails 49 for the articles c, which are delivered by the conveyor to a receiving station or table (not shown) as is known.

The posts 38 are secured at their upper ends in split sleeve clamps 51 bolted to angle brackets 52 suitably secured, conveniently by welding, to the under face of a top plate or table 53 shaped similarly to the base housing cover plate 16 and thus supported an appropriate distance thereabove and parallel therewith, as shown in Figures 1 and 1A. A central shaft 54, stepped at its lower portion, as shown in Figure 5, extends downwardly through gear casing 22 and cover plate 16 and seats at its lower end in a flanged support 55, in which it is suitably secured, bolted to cover plate 16 at the under face thereof. The upper portion of shaft 54 is also stepped, as shown in Figure 7, and the reduced upper extension 54a thereof projects through table 53 and the top wall of an upper gear casing 56 secured on table 53. A stop collar 57, secured on the upper end of shaft 54 and seating on a ring 58 which seats on a collar 59 secured to top wall 60 of gear casing 56; cooperates with support 55 for restraining shaft 54 against downward movement. As will be understood from what has been said, shaft 54 is fixed and is effectively held against downward movement.

Referring to Figures 3, 4 and 5, a miter gear 62, secured on the inner end of shaft 21, meshes with a miter gear 63 rotatably mounted on the reduced lower portion 54b of shaft 54. A flange 64, welded on the upper end of the hub of miter gear 63, is bolted to a flange 65 welded to the lower end of a sleeve 66 rotatably mounted on shaft 54, the flanges 64 and 65 being also bolted to a box cam 67 seating on flange 65, to be referred to more fully hereinafter. A flange 68, welded on the upper end of sleeve 66, is bolted to a bearing housing 69 carrying a thrust ball bearing 70 the inner race 71 of which is fixed on shaft 54, by an eccentric locking collar 71a in a known manner. Flange 68 and housing 69 are also bolted to an arm 72 disposed therebetween and extending outwardly therebeyond radially of shaft 54.

Referring more particularly to Figure 7, the transmission shaft 25 extends through table 53 into gear housing 56, in which it is rotatably mounted in ball bearing 73 carried by a retainer 74 bolted to table 53. A lock nut 75, threaded on shaft 25 and seating on the inner race 76 of bearing 73, with an intervening washer 77, coacts with the lower thrust bearing in housing 26 for restraining shaft 25 against downward movement. A miter pinion 78, secured on the upper end of shaft 25, meshes with a miter pinion 79 secured on the outer end of a horizontal shaft 80 rotatably mounted in gear casing 56. A miter gear 81, secured on the inner end of shaft 80, meshes with a miter gear 82 splined upon the upper end of a sleeve 83 extending downwardly through table 53 about the reduced upper portion 54a of shaft 54. A flange 84, welded to the lower end of sleeve 83, is bolted to a bearing housing 85 carrying a ball bearing 86 the inner race 87 of which seats, at its lower end, in a recessed lock collar 88 fixed on shaft 54. The collar 88 locks inner race 87 on shaft 54 and in cooperation with race 87 and associated parts restrains sleeve 83 against downward movement relative to shaft 54, as will be understood from the above. The flange 84 and the bearing housing 85 are also bolted to a sectorial pick-up plate 89 disposed therebetween and extending outwardly therebeyond radially of shaft 54. It will be understood, from what has been said, that when shaft 21 is driven the sleeves 66 and 83 are rotated about shaft 54, the gearing and the gear ratio in each instance being such that sleeves 66 and 83 are rotated at the same speed and in counter-clockwise direction as viewed in Figures 3 and 6.

The pick-up plate 89, in its rotation with sleeve 83, covers and uncovers the upper end of an underlying guide means (Figs. 1 to 1B, 3 and 10) comprising inner and outer guide members 92 and 93, respectively. The inner guide members 92 are spaced apart vertically and are supported in vertical alignment by supporting arms 94 removably secured in shaft 54 and extending radially outward thereof. The outer guide members 93 are spaced outward from the inner members 92 and are supported by arms 95 removably secured in a post 96. The post 96 is mounted between a lower angle cross member 97, bolted to split sleeve clamps 98 secured to the two corner posts 38 at the adjacent side of the base housing 15, and a bracket 99 secured to an upper angle cross member 100 bolted to split sleeve clamps 101 secured on the same posts 38 as the clamps 98. The outer guide members 93 terminate a material distance—approximately the height of an article or container—above the lower end of the lowermost inner guide member 92. The lowermost outer guide member, designated 93a, is cut away at its lower end to provide two side extensions 93b. Two release or discharge guide members 102 and 102a, to be referred to more fully later, normally underlie extensions 93b of guide member 93 providing downward extensions thereof, the lower ends of the discharge guide members 102 and 102a preferably being approximately in the plane of the lower end of the lowermost inner guide member 92. It will be seen that the guide members 92 and 93 and 93a may readily be removed and replaced to suit requirements. The discharge guide members 102 and 102a may also readily be removed and replaced, as will appear more fully later. That renders it possible to change the guide members and the spacing thereof to accommodate articles of various sizes and shapes. It may be assumed, for purposes of description, that the articles or containers c to be moved through the guide way between the inner and outer guide members are cylindrical bottles. Accordingly, the inner faces of the guide members are curved or concaved on the radius of the container c and are spaced apart horizontally a distance approximately the same as the diameter of container c, defining between them a vertical guide way through which the containers travel from one level to another, as shown in Figure 10.

Travel of the containers c through the guide way is controlled by a helical track member 105 concentric with center shaft 54 and rotatable about the axis thereof, the convolutions of which pass through the guide way between the inner guide members 92 and the outer guide members 93, 93a and 102. The upper end of track member 105 is secured to the following edge of pick-up plate 89, as shown more clearly in Figures 1A and 6, and its lower end is secured to the outer end of arm 72, as shown in Figures 1, 1B and 5. The track member 105 is supported intermediate its ends by arms 106 secured to bearing housings 107 containing thrust ball bearings (not shown) supporting housings 107 for rotation about shaft 54 and restrained against downward movement along shaft 54. The track supporting arms 106 are spaced conformably to the spaces between the inner guide members 92 and pass therebetween during rotation of the track member. The shaft 54 provides a stationary central column about which the track member 105 is rotated in the use of the machine, and also provides support for the inner guide members 92, as previously explained.

The track member 105 is rotated counter-clockwise, as viewed in Figures 3 and 6 and lowers the containers c through the guide way onto the upper run of the discharge conveyor 45. The outer discharge guide 102 is removably secured, in a suitable manner, to the upper end of an upright 110 (Figs. 1, 1B, 3, 5 and 13) removably mounted on a base 111 bolted to the upper end of a spur gear 112 rotatably mounted on the upper end of a stub shaft 113 passing through cover plate 16 (Figures 1B and 5) and seating, at its lower end, in a flanged supporting member 114 bolted to cover plate 16 at the underface thereof. The upper portion of stub shaft 113 is stepped and extends through the frame 36. Guide member 102a is removably mounted on an upright 115 which is removably mounted on a base 116 bolted to the upper end of a spur gear 117 rotatably mounted on stub shaft 113 below the spur gear 112. The spur gear 112 meshes with an upper spur gear 118 keyed on a counter shaft 119 rockably mounted in frame 36. The lower spur gear 117 on stub shaft 113 meshes with a spur pinion 120 rotatably mounted on a stud 121 anchored in and extending upwardly from the bottom of frame 36. Spur pinion 120 meshes with a lower spur gear 122 keyed on the counter shaft 119. An arm 123 is secured on the lower end of counter shaft 119, below frame 36, and has a cam follower, in the form of a pin 124, secured in its outer end. Arm 123 overlies the box cam 67 and the pin or cam follower 124 engages in groove 125 in the upper face of cam 67. The groove or channel 125 of cam 67 is shaped as shown in Figure 3. In the rotation of cam 67 counter shaft 119 is oscillated about its axis to an extent such as to swing the discharge guides 102 and 102a from their normal operative positions shown in Figure 3 in opposite directions through an arc of approximately 45°, into their inoperative positions clear of a container c which has been deposited by the track member 105 upon the upper run of the discharge conveyor 45, which moves the container thus deposited outwardly away from the guide way. The angular position of cam 67 relative to the center shaft 54 is such that the discharge guides 102 and 102a will be swung to their inoperative or releasing positions at the time of deposit upon the upper run of conveyor 45 of a container c by the track member 105, channel 125 of cam 67 being of suitable shape and extent to assure that the discharge guide members 102 and 102a will remain in their inoperative positions until the container has been moved clear of such guide members, and that the guide members 102 and 102a will be returned to their operative positions before a succeeding container passes downward beyond the lower outer guide member 93a.

The containers c are delivered to the guide way by means comprising a main feed conveyor 128 and a supplementary feed conveyor, termed an infeed conveyor 129. The main feed conveyor 128 may be any suitable known type of endless conveyor and is driven by a motor-speed reducer unit 130 mounted on table 53, through a chain and sprocket drive 131. The conveyors 128 and 129 are disposed in adjacent parallel relation and the infeed conveyor 129 extends inwardly a substantial distance beyond the main conveyor 128, as shown more clearly in Figure 6. A dead plate 132 extends from the inner or delivery end of the infeed conveyor 129 and bridges the space between the latter and the pick-up plate 89, when that plate is in operative position covering the upper end of the vertical guide way. A fixed guide or stop 133 is mounted by arms 134 on a bracket 135 bolted to table 53 at the under face thereof. The stop 133 cooperates with means to be described presently for positioning a container upon the sectorial pick-up plate 89 in alignment with the vertical guide way. Guide rails 136 extend along the sides of the main feed conveyor 128 for confining the containers c thereon, the inner portions 136a of rails 136 being inclined across the conveyors 128 and 129 for directing the containers from conveyor 128 onto the infeed conveyor 129. A guide rail 137 extends along one side of the inwardly extending portion of the infeed conveyor 129, as a continuation of one of the guide rails 136a, the inner end of guide rail 137 being disposed in close proximity to the stop 133. A feed worm 138 extends along the infeed conveyor 129 at the opposite side thereof from rail 137 and cooperates therewith for moving the containers c inwardly along the inner portion of conveyor 129 and over the dead plate 132 onto the pick-up plate 89 into contact with the stop 133. Worm 138 is provided with a helical groove increasing in pitch from its outer or tip end to its inner or base end, for accelerating the rate of travel of the containers and advancing them to the pick-up plate 89. The helical groove 139 of worm 138 opens, at its inner end into a circumferential groove 140 adjacent the inner or base end of worm 138, which groove 140 cooperates with the stop member 133 for positioning a container c upon the pick-up plate 89, when the latter covers the guide way, in vertical alignment with the guide way, as shown in Figure 6. The worm 138 is driven in proper direction and at appropriate speed, by means to be described presently. The guide rail 137 is carried by brackets 141 (Figures 6 and 12) carried by posts 144 pivoted at their lower ends and yieldingly urged inward by tension springs 142 anchored at their inner ends to the frame of the infeed conveyor 129 and at their outer ends to brackets 145, also carried by posts 144, by means of adjusting screws 143. In the event of a container becoming jammed between screw 138 and rail 137, the latter can yield outwardly thus avoiding risk of breakage of the container, particularly if it is formed of glass or other easily broken material.

The worm 138 preferably is formed of a material having a low coefficient of friction and is tubular, for mounting upon a drive shaft 146 the outer end of which is unobstructed for ready removal and replacement of worm 138, which is thus capable of being readily changed to suit requirements. Worm 138 is confined between a collar 147 fixed on shaft 146 and seating against the base end of worm 138, and a flanged nut 148 threaded onto the outer end of shaft 146, collar 147 being provided with projections engaging into corresponding recesses in the base of worm 138 providing driving connection between the latter and shaft 146.

The worm 138 formed as above described has proved to be efficient when used in connection with straight sided containers or bottles of substantial height, such as the containers c. In the case of containers of irregular side design and having a straight side of materially less height than that of the containers c, difficulty was encountered due to the fact that the straight side of the container or bottle was not of sufficient length to maintain contact with groove 140 of worm 138 and stop member 133 while being transferred by track 105 to a stable position between guides 92 and 93. In such cases the tendency of the container, particularly at the higher speeds of operation of the machine, is to assume a position perpendicular to track 105, with resultant stoppage of downward movement of the container and breakage thereof, if the container is a glass bottle or of a readily breakable character. I have overcome that difficulty in the manner shown in Figure 14, in which I have shown a container $c^2$, which is a glass bottle of the decanter type having a comparatively short straight side.

The worm 138a is rotated clockwise, as indicated by the arrow, and is provided at its base portion, with a cam shaped element 138b extending radially into groove 140a. The bottle $c^2$ enters groove 140a so as to be confined in the portion thereof opposite cam element 138b in contact with stop member 133 and seating on the pick-up plate 89, which travels in the direction indicated by the arrow. The pick-up plate 89 in its continued travel passes from beneath bottle $c^2$, which is then lowered onto the track 105, which travels in the direction indicated by the arrow. As the shoulder of bottle $c^2$ passes below the horizontal plane of the axis of worm 138a cam element 138b has reached a position overlying the shoulder. When bottle $c^2$ is in its broken line position indicated, cam element 138b is in its broken line position indicated adjacent the neck of the bottle $c^2$, effective for preventing objectionable tilting thereof toward the left. In the continued lowering of bottle $c^2$, cam element 138b extends adjacent the neck thereof until the body of bottle $c^2$ is positioned for its full height between guides 92 and 93, then effective for preventing tilting of bottle $c^2$, which is then lowered in the continued travel of track 105 in the manner previously described. As bottle $c^2$ enters for its full height between guides 92 and 93 the cam element is returned to its full line position shown, to permit entry of a succeeding bottle into the inner side portion of groove 140a, as above. The worm 138a is readily removable and replaceable, as above described. By providing a plurality of worms having cam elements of various extents, short walled containers of various shapes and sizes may readily be accommodated. In that connection, a given worm having a cam element such as element 138a may accommodate short walled bottles of the same general type but varying in height and shape, as will be understood.

Referring to Figures 1, 2, 6 and 7, a spur pinion 150 is keyed on shaft 80 within the gear housing 56 and meshes with spur pinion 151 keyed on a counter-shaft 152 rotatably mounted in gear housing 56 adjacent and parallel with shaft 80. A sprocket wheel 153 is keyed on countershaft 152 adjacent the inner end thereof and has driving connection by means of a sprocket chain 154 with a sprocket wheel 155 secured on the drive shaft 156 of the infeed conveyor 129, which is thus driven in properly timed relation to the other parts of the machine. The table 53 is provided with an opening 157 (Figure 2), and a suitable hood or guard 158 is bolted in position over opening 157, and over an opening through the adjacent side wall of gear housing 56, to accommodate the sprocket chain 154.

Referring more particularly to Figures 2 and 7, a shaft 161 is rotatably mounted in gear casing 56 coaxially with shaft 80 and at the opposite side therefrom of the reduced upper portion 54a of shaft 54. A miter gear 162 is keyed on the inner end of shaft 161 and meshes with the miter gear 82. A miter pinion 163, keyed on the outer end of shaft 161, meshes with a miter pinion 164 splined on a shaft 165 rotatably mounted in gear housing 56 and perpendicular to shaft 161. A sprocket wheel 166 is secured on shaft 165 a short distance from the outer end thereof and overlies a rectangular opening 167 in table 53. The shaft 165, and with it the sprocket wheel 166, is thus driven in timed relation to the other components of the machine.

The opening 167 in table 53 overlies the open upper end of a flanged gear housing 169, shown more clearly in Figures 1, 6, 8 and 9. The gear housing 169 is bolted to the underface of table 53 and comprises a main housing 170 and a supplementary housing 171. A sprocket chain 172 passes about sprocket wheel 166 and thence downwardly and about a lower sprocket wheel 173 keyed on a stub shaft 174 rotatably mounted in the main housing 170. A second sprocket wheel 175, also keyed on shaft 174, has driving connection, by means of a chain 176 to a sprocket wheel 177 keyed on a shaft 178 rotatably mounted in housing section 170 and the supplementary housing section 171. A spur pinion 179, keyed on shaft 178 within the supplementary housing section 171 meshes with a spur pinion 180 keyed on the worm drive shaft 146, the inner end portion of which is rotatably mounted in the supplementary housing section 171 and which is restrained against endwise movement in either direction by suitable known means. The worm drive shaft 146 is thus driven in proper direction and in timed relation to the other components of the machine during operation thereof.

An end plate 183, bolted to the outer end of the supplementary housing section 171, extends upwardly beyond the latter and is provided in its upper portion with an arcuate slot 184 concentric with shaft 178. A socket headed cap screw 185 passes through slot 184 and screws into inner end plate 186 of the main housing section 170. Plate 186 extends downward beyond housing section 170 and is provided in its lower portion with an arcuate slot 187, also concentric with shaft 178. A socket headed cap screw 188 passes through slot 187 and threads into end plate 183 of the supplementary casing section 171. As will be understood from what has been said, by loosening the cap screws 185 and 188, the supplementary casing section 171 may be adjusted about shaft 178 in either direction to the full extent permitted by the slots 184 and 187, and by tightening the cap screws 185 and 188 in contact with the associated washers 185a and 188a, respectively, the supplementary housing section 171 may be effectively secured in adjustment. By adjusting supplementary housing or casing section 171 about shaft 178, the feed screw 138 may be adjusted toward or away from the guide rail 137 to accommodate containers c or other articles of widely varying thickness or width. Referring more particularly to Figures 1A and 6, an adjusting screw 190 is rotatably mounted through a finger 191 extending from bracket 135, screw 190 being restrained against endwise movement relative to finger 191 in a suitable known manner. The screw 190 has threaded engagement in a tubular post 192 fixed to a finger 193 pivotally mounted in a collar 194 surrounding the worm shaft 146. A collar 194 is provided with an upward extension 194a which is pivoted, at 196, on bracket 135 coaxially with shaft 178 in the supplementary gear casing section 171. The shaft 146 may thus be adjusted, by means of the screw 191 toward or away from guide rail 137 to suit requirements. While the adjusting screw 190 and associated parts are not essential, they are preferred for accuracy in adjusting the worm toward and away from guide rail 137, as will be understood.

In the operation of the machine the articles or containers c are advanced by the conveyors 128 and 129 and the screw 138 over the dead plate 132 onto the pick-up plate 89, the rotation of which is timed so that it overlies the vertical guide way during the time an article is advanced across dead plate 132 into contact with the stop 133, in which position the article or container is retained by the circumferential groove 140 of worm 138, as above explained. In the continued rotation of the pick-up plate 89 in counterclockwise direction as viewed in Figure 6, the vertical guide way is uncovered and the article or container then moves downward through the guide way under the control of the helical track member 105 and is deposited thereby upon the upper run of the discharge conveyor 45. As the container is deposited upon the discharge conveyor, the discharge guides 102 and 102a are swung into releasing or inoperative positions by the box cam 67 and associated parts, in which positions they clear the container which may then be moved outward by the discharge conveyor 45. The fixed center shaft 54 provides a center column which supports the inner guide members 92 and also rotatably supports the helical track member 105 for rotation about the axis of such column. The components of the machine are driven from the electric motor 17, except the main feed conveyor 128 which is driven by the unit 130, and are operated in properly timed relation to perform their various functions in proper sequence as above described.

It will be understood that variations in detail may be resorted to without departing from the field and scope of my invention, and I intend to include all such variations, as fall within the scope of the appended claims, in this application in which the preferred form only of my invention has been disclosed.

I claim:

1. In an article transferring machine, inner guide means and outer means defining between them a substantially vertical guide way for articles to be moved therethrough, a helical track member rotatable about a substantially vertical axis with its convolutions passing through said guide way, means for rotating said rack member, a discharge conveyor underlying said guide way and track member and travelling from said inner guide means toward said outer guide means, the latter means comprising a lower section normally in operative position and movable outward to inoperative position clear of articles deposited on said conveyor by said track member, said lower section being spaced above said conveyor a distance materially less than the height of the articles being transferred, and means for moving said outer guide means lower section to operative and inoperative positions in timed relation to rotation of said track member.

2. In an article transferring machine, a plurality of horizontally spaced guide members defining between them a substantially vertical guide way for articles to be moved therethrough, a helical track member disposed to one side of said guide way rotatable about a substantially vertical axis and spaced from said guide way a distance such that in the rotation of said track member the convolutions thereof pass through said guide way, a discharge conveyor underlying said guide way and track member and travelling toward the other said of said guide way, the guide members at said other side of said guide way comprising lower sections normally in operative position and movable outward to inoperative position clear of articles deposited on said conveyor by said track member, said lower section being spaced above said conveyor a distance materially less than the height of the aritcles being transferred, and means for moving said guide member lower sections to operative and inoperative positions in timed relation to the rotation of said track member.

3. In an article transferring machine, a plurality of horizontally spaced guide members defining between them a substantially vertical guide way for articles to be moved therethrough, a helical track member disposed to one side of said guide way rotatable about a substantially vertical axis and spaced from said guide way a distance such that in the rotation of said track member the convolutions thereof pass through said guide way, a substantially horizontal pick-up plate attached at one end to the upper end of said track member constituting an extension thereof and extending radially outward therebeyond, said plate being above said guide way and of an extent to overlie the latter and to pass therebeyond in the rotation of said track member, a feed conveyor, means operated in timed relation to the rotation of said track member for delivering articles from said conveyor to said plate in position thereon in alignment with said guide way and for restraining an article on said plate against movement therewith, a discharge conveyor underlying said guide way and track member and travelling toward the other side of said guide way, the guide members at said other side of said guide way comprising lower sections normally in operative position and movable outward to inoperative position clear of articles deposited on said discharge conveyor by said track member, said lower sections being spaced above said conveyor a distance materially less than the height of the articles being transferred, and means for moving said guide member lower sections to operative and inoperative positions in timed relation to the rotation of said track member.

4. In an article transferring machine, a plurality of horizontally spaced guide members defining between them a substantially vertical guide way for articles to be moved therethrough, a helical track member disposed to one side of said guide way rotatable about a substantially vertical axis and spaced from said guide way a distance such that in the rotation of said track member the convolutions thereof pass through said guide way, a substantially horizontal pick-up plate attached at one end to the upper end of said track member constituting an extension thereof and extending radially outward therebeyond, said plate being above said guide way and of an extent to overlie the latter and to pass therebeyond in the rotation of said track member, a feed conveyor substantially in the plane of said plate, stop means above said plate disposed to position an article thereon in alignment with said guide way and to restrain the article against movement with said plate, means operated in timed relation to the rotation of said track member for delivering articles from said conveyor to said plate in cooperative relation to said stop means, a discharge conveyor underlying said guide way and track member and travelling toward the other side of said guide way, the guide members at said other side of said guide way comprising lower sections normally in operative position and movable outward to inoperative position clear of articles deposited on said discharge conveyor by said track member, said lower sections being spaced above said conveyor a distance materially less than the height of the articles being transferred, and means for moving said guide member lower sections to operative and inoperative positions in timed relation to the rotation of said track member.

5. In an article transferring machine, inner and outer guide members spaced apart horizontally and defining between them a substantially vertical guide way for articles to be moved therethrough, said inner guide members being spaced apart vertically, a fixed substantially vertical column disposed to one side of said inner guide members, supporting arms rotatably mounted on said column, a helical track mounted on the outer ends of said arms concentric with said column and extending into said guide way, and means for rotating said arms and track, said arms passing between said inner guide members during rotation of said track.

6. In an article transferring machine, inner and outer guide members spaced apart horizontally and defining between them a substantially vertical guide way for articles to be moved therethrough, a fixed substantially vertical column disposed to one side of said inner guide members, inner guide member supporting arms fixed to said column extending radially therefrom toward said guide way, said inner guide members being mounted on said arms and spaced apart vertically, track supporting arms rotatably mounted on said column, a helical track mounted on the outer ends of said track arms concentric with said column and extending into said guide way, and means for rotating said track arms and track, said track arms passing between said inner guide members during rotation of said track.

References Cited in the file of this patent

UNITED STATES PATENTS

| 510,626 | Zeller | Dec. 12, 1893 |
| 876,660 | Ritchie | Jan. 14, 1908 |
| 1,355,184 | Taliaferro et al. | Oct. 12, 1920 |
| 1,649,267 | Tevander | Nov. 15, 1927 |
| 1,702,554 | Walker | Feb. 19, 1929 |
| 2,122,711 | Birkenbeuel | July 5, 1938 |
| 2,344,975 | DeBack | Mar. 28, 1944 |
| 2,571,790 | Tomkins | Oct. 16, 1951 |

FOREIGN PATENTS

| 186,300 | Great Britain | Nov. 2, 1922 |

UNITED STATES PATENT OFFICE
CERTIFICATE OF CORRECTION

Patent No. 2,854,125 September 30, 1958

George F. Johnson

It is hereby certified that error appears in the printed specification of the above numbered patent requiring correction and that the said Letters Patent should read as corrected below.

Column 9, line 1, after "outer" insert -- guide --; line 5, for "rack" read -- track --.

Signed and sealed this 6th day of January 1959.

(SEAL)
Attest:

KARL H. AXLINE
Attesting Officer

ROBERT C. WATSON
Commissioner of Patents